Oct. 11, 1932.   J. M. NEILL   1,882,337
GLASS HEATER
Filed March 11, 1930
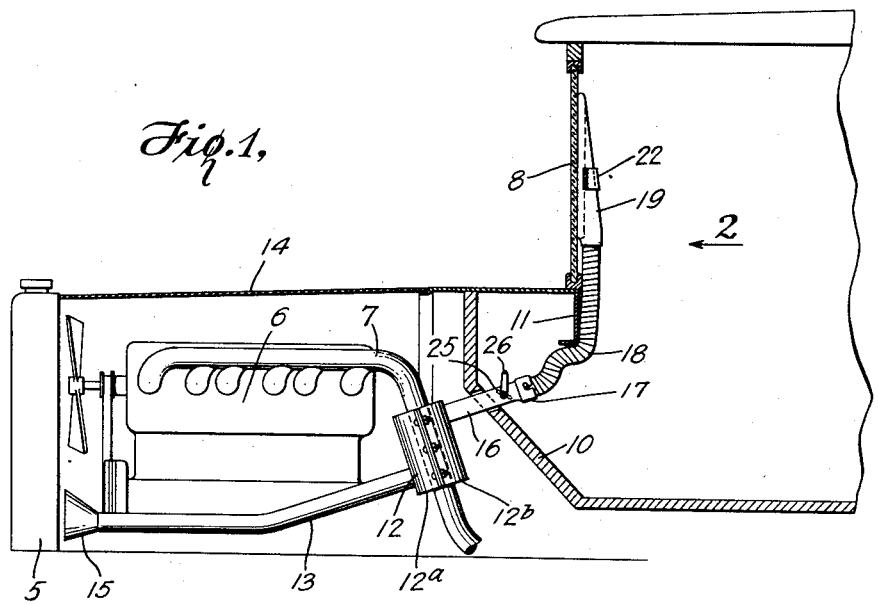
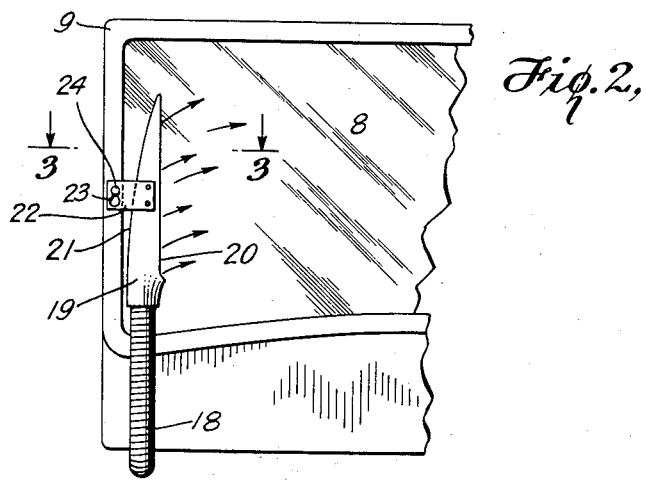
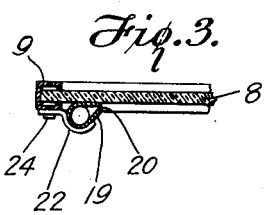
INVENTOR.
JOHN M. NEILL.
BY
ATTORNEY Patented Oct. 11, 1932

1,882,337

UNITED STATES PATENT OFFICE

JOHN M. NEILL, OF NEWBURGH, NEW YORK

GLASS HEATER

Application filed March 11, 1930. Serial No. 434,860.

This invention relates to devices for heating window glasses of various kinds and classes and particularly what are known as windshield glasses of motor vehicles; and the object of the invention is to provide a device of the class described involving a stove adapted to be applied to the exhaust manifold of an internal combustion engine of the vehicle with means exposed to the radiator of the vehicle for supplying air to said stove with means for discharging the heated air into the driver's seat compartment and for transmitting the air through a flexible tube and a discharge nozzle at the end of said tube onto the windshield glass of the vehicle to heat the same to prevent the collection of frost, steam, vapor or the like thereon; and with this and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic side sectional view of the front end portion of a vehicle illustrating the manner of arranging my improved heater device in connection therewith.

Fig. 2 is a view looking in the direction of the arrow 2 of Fig. 1; and,

Fig. 3 is a partial section on the line 3—3 of Fig. 2.

In Fig. 1 of the drawing, I have indicated for the purpose of illustrating one use of my invention a part of a motor vehicle. In said figure, 5 represents the radiator of the vehicle, 6 the engine, 7 the exhaust pipe leading from the engine, 8 the windshield panel arranged in the frame 9 in front of the driver's seat compartment, 10 the footboard of the driver's seat compartment, and 11 the instrument panel.

In practice, I provide what is known as a stove 12 consisting of separate parts 12 and 12b clamped or otherwise secured upon the manifold 7 leading from the motor 6 at a point adjacent the footboard 10. At 13, I have shown a pipe opening into the stove 12 and extending forwardly with respect to the vehicle and within the hood 14 thereof, the front end of said pipe having a flared throat 15 disposed adjacent the lower end of the radiator 5 whereby fresh air will be transmitted through said pipe 13 and into and through the stove 12. A pipe 16 is employed to discharge the heated air through the stove, said pipe passing through the footboard 10 and having a coupling end 17 with which a flexible pipe 18 is detachably coupled, the free end of the pipe 18 having an elongated nozzle 19, the discharge opening being disposed longitudinally of one side edge thereof as seen at 20, note especially Fig. 3. The opposite side edge 21 of the nozzle is curved to direct the discharge of air from the nozzle into the panel 8 of the windshield in the manner indicated in Fig. 2 of the drawing. The nozzle is supported vertically with respect to one side edge of the windshield by means of a supporting bracket 22 having a key-hole aperture 23 detachably engaging a supporting pin 24 of the frame 9 of the windshield.

It is also preferred that a butterfly or other valve 25 be arranged in the pipe 16 preferably within the driver's seat compartment and adjacent the coupling 17, a lever or other manually operated member 26 being employed to control the operation of the valve 25.

It will be understood that when the device is not in use, the flexible tube 18 and nozzle 19 may be detached and carried in the tool kit or other compartment of the vehicle and the valve 25 closed. In cold weather driving, and notwithstanding the condition of the windshield, the valve 25 may be opened in order to heat the front, driver's seat compartment of the vehicle, which heat will radiate throughout the entire compartment within the vehicle of the enclosed type and especially in sedans, coupés, and etc.

Whenever desired, the nozzle 19 and tube 18 may be attached for discharging the heated air upon the inner surface of the windshield to maintain the same at such temperature as to prevent the collection of sleet, frost, steam or vapor thereon, the device operating to maintain the windshield or that part thereof controlling the vision of the operator of the vehicle in a relatively clear and transparent state.

It will be understood that while I have shown the invention as applied to motor vehicles of a specific type, that the same may be applied to vehicles of any kind or class, and in fact may be utilized in connection with window panels of any kind or class where it is possible to acquire a source of heat supply as well as air supply to the heating unit or stove for transmission outwardly through the nozzle of the device, and various changes in and modifications of the construction herein shown and described may be made within the scope of the appended claims without departing from the spirit of my invention or sacrificing its advantages.

Having fully described my invention, what I claim as new and desire to secure by Letters Patent, is:

1. A nozzle unit for discharging heated air upon the inner surface of the window panel of a motor vehicle windshield, said unit comprising an elongated nozzle having an air admission opening at one end and a discharge opening arranged longitudinally of one side thereof, the other side of said nozzle being curved longitudinally in the direction of the discharge to direct the current of air to said discharge, and means for detachably supporting said nozzle at one side of the windshield frame with the opening of said nozzle directed toward the window panel.

2. A nozzle unit for discharging heated air upon the inner surface of the window panel of a motor vehicle windshield, said unit comprising an elongated nozzle having an air admission opening at one end, one surface of which is flat and the other surface rounded, one side edge of the flat surface of the nozzle having a discharge arranged longitudinally of the nozzle, the other side edge of the nozzle being curved longitudinally in the direction of the discharge, means projecting from the curved side edge of the nozzle for detachably supporting the same in connection with the windshield frame in such manner that the flat surface of the nozzle will rest upon the window panel to direct the air discharged from the opening of said nozzle directly upon the surface of the window panel.

3. A nozzle unit for discharging heated air upon the inner surface of the window panel of a motor vehicle windshield, said unit comprising an elongated nozzle having an air admission opening at one end, one surface of which is flat and the other surface rounded, one side edge of the flat surface of the nozzle having a discharge arranged longitudinally of the nozzle, the other side edge of the nozzle being curved longitudinally in the direction of the discharge, means projecting from the curved side edge of the nozzle for detachably supporting the same in connection with the windshield frame in such manner that the flat surface of the nozzle will rest upon the window panel to direct the air discharged from the opening of said nozzle directly upon the surface of the window panel, and a flexible tube constituting part of the nozzle and extending from the open end thereof.

In testimony that I claim the foregoing as my invention I have signed my name this 10th day of March, 1930.

JOHN M. NEILL.